United States Patent [19]

Crocetti

[11] Patent Number: 4,779,603
[45] Date of Patent: Oct. 25, 1988

[54] BRICK SAW CONTAINER

[76] Inventor: Louis C. Crocetti, 210 Warren Avenue, Baltimore, Md. 21230

[21] Appl. No.: 104,947

[22] Filed: Oct. 6, 1987

Related U.S. Application Data

[63] Continuation-in-part of Ser. No. 839,159, Mar. 12, 1986, abandoned.

[51] Int. Cl.⁴ .............................................. B28D 1/04
[52] U.S. Cl. .............................. 125/13 R; 125/13 SS; 51/272
[58] Field of Search .................. 125/13 R, 13 SS, 13P, 125/14; 51/272, 92 R, 135 R

[56] References Cited

U.S. PATENT DOCUMENTS

| | | | |
|---|---|---|---|
| 1,047,571 | 12/1912 | Sadler | 51/272 |
| 2,491,047 | 12/1949 | Hunt | 125/13 R |
| 3,844,269 | 10/1974 | Rater | 125/13 R |
| 4,055,160 | 10/1977 | Wilson | 125/13 SS |
| 4,068,648 | 1/1978 | Erdman | 125/13 R |
| 4,221,081 | 9/1980 | Everett | 51/135 R |
| 4,423,569 | 1/1984 | Gould | 51/272 |
| 4,424,649 | 1/1984 | Vincint | 51/92 R |
| 4,484,845 | 11/1984 | Pennella | 51/272 |
| 4,570,609 | 2/1986 | Hogue | 125/13 R |

Primary Examiner—Robert P. Olszewski
Assistant Examiner—Shideler: B.

[57] ABSTRACT

An improved shielding against splash of rearward-ejected slurry and dust provides a circular-saw brick-sawing container with a broad shield having a front edge overlapping the saw shroud, and in turn having a rear edge overlapped by a fixed horizontal shield connected with an upright fixed shield spaced from the saw container backsplash. A "Z"-shaped member resiliently connects the broad shield with the saw arm permitting a close, moving overlap at the aforementioned rear edge overlapped by the fixed horizontal shield. Laterally spaced vertical fixed-shields respectively adjacent an angled end of the broad shield splash container at the sides and a half-moon shaped array of spray nozzles wet down dust of dry sawing, controlled by a three-way valve that also controls a saw-wetting spray, both with recirculated, screened water froma catch pan base.

4 Claims, 2 Drawing Sheets

BRICK SAW CONTAINER

This application is a continuation-in-part of my application for U.S. patent, Ser. No. 839,159, filed Mar. 12, 1986, now abandoned, for BRICK SAW CONTAINER and abandoned as of the filing of this application.

FIELD OF THE INVENTION

This invention relates generally to power saws and specifically to shielding systems for containing circular saws.

BACKGROUND OF THE INVENTION

The inventor gives background of the invention as known to him, as follows:

"No brick saw that is known to the inventor has been surrounded by a cabinet or container like that of this invention, especially a brick saw container with all of these advantages to the brick saw, the operator, contractor and the job site. Brick saws have been used for many years. Some earlier saws were used for dry cutting only with a carborundum blade. Later, the industry produced wet-cutting saws using a diamond blade. After some time, it was prohibited to dry cut on some jobs because of the dust factor. The present saws use water and by rotation of the saw blades throw a lot of water in the surrounding area. Because of this on a lot of jobs, saws are placed in the outside of the building being constructed. The brick saws' motors are waterproof so the practice is to cover the 220-120 volt switch and water pump only. This brick saw container will eliminate most hazards. As a result of surrounding the brick saw with a container according to this invention, the container backsplash, water spray collector and shields will contain most of the water sprayed by the saw blade and return the water to the bottom of the base pan. This brick saw container has a fine mesh screen basket which the water pump sits in and recycles the strained water to either the wet cutting diamond blade or the carborundum or diamond blade through tubes, thus diverting the flow to either tube by turning a three-way valve which closes one side or the other. The back splash will hold the three way valve. It will hold a cover over the 220-120 volts receptacle, making the electricity apparatus water-proof. It will have a clip for grounding saw and back splash to eliminate all possible electric shock after it is wired to a ground. None of these features is believed to be now used in the brick saw operations. The pump is either in a barrel, or in the brick saw well which is a poor arrangement.

Saw operators often have to stop work to clean out the lines because the lines get clogged up with the cutting particles of material they are cutting, such as glazed tile, spectra glaze, concrete blocks, bricks, etc. The diamond blade is made to cut with a full flow of water but these particles get in the lines and the operator does not notice that his water is getting restricted more and more and therefore it will take longer to cut the material, and wear out the blade faster. On jobs where the law will not allow dry cutting on account of the dust factor, my system would alloy the spray of water to dampen most of the dust and prevent escape to the atmosphere. Shielding will stop spray from going to the motor and also hold the half-moon spray for dry cutting. As will be seen, the back shield is stationary while the front shield will move back and forth under the back shield as the saw arm goes up and down. The water spray collectors of the container will take care of the spray that bounces off the cutting table, also the drippings from the cutting table and take it back to the bottom of the pan. The two water spray collectors at the side are easily removed if a cut has to be made further than sixteen inches from the end of any material, for example, to a concrete lintel or a marble sill, or the like. If the bottom of the pan is higher than the foot pedal of the saw, the saw will be raised in the water pan to allow pedal to move up and down freely. The moving saw-table and all below it will sit under the shields. The back shield has a hole in it for the tube that goes to the dry cutting spray nozzle and also a slot in it for the connection bar to pass through so it can connect to the pedal to the saw which is above the shields. This operates the blade up and down, as needed.

It will be appreciated that now there are some small table model brick saws which would mean that this brick saw container would be modified by eliminating the provisions for dry cutting, making unit considerable smaller in size. There are also larger brick saws and this container would have to be made larger. There are smaller smaller models of standing brick saws that might not use the shields, or for which the shields must be relocated, but in some cases this brick saw container will apply."

SUMMARY OF THE INVENTION

In brief summary given as cursive description only and not as limitation, the invention includes provision of improved shielding in a rotary brick saw system to contain spray and dust by a series of overlapped or shingled-relation flat shield portions that in part include relative movement, one with another.

BRIEF DESCRIPTION OF THE DRAWINGS

The above and other objects and advantages of this invention will become more readily apparent on examination of the following description, including the drawings in which like reference numerals refer to like parts.

DETAILED DESCRIPTION

Figure 1:
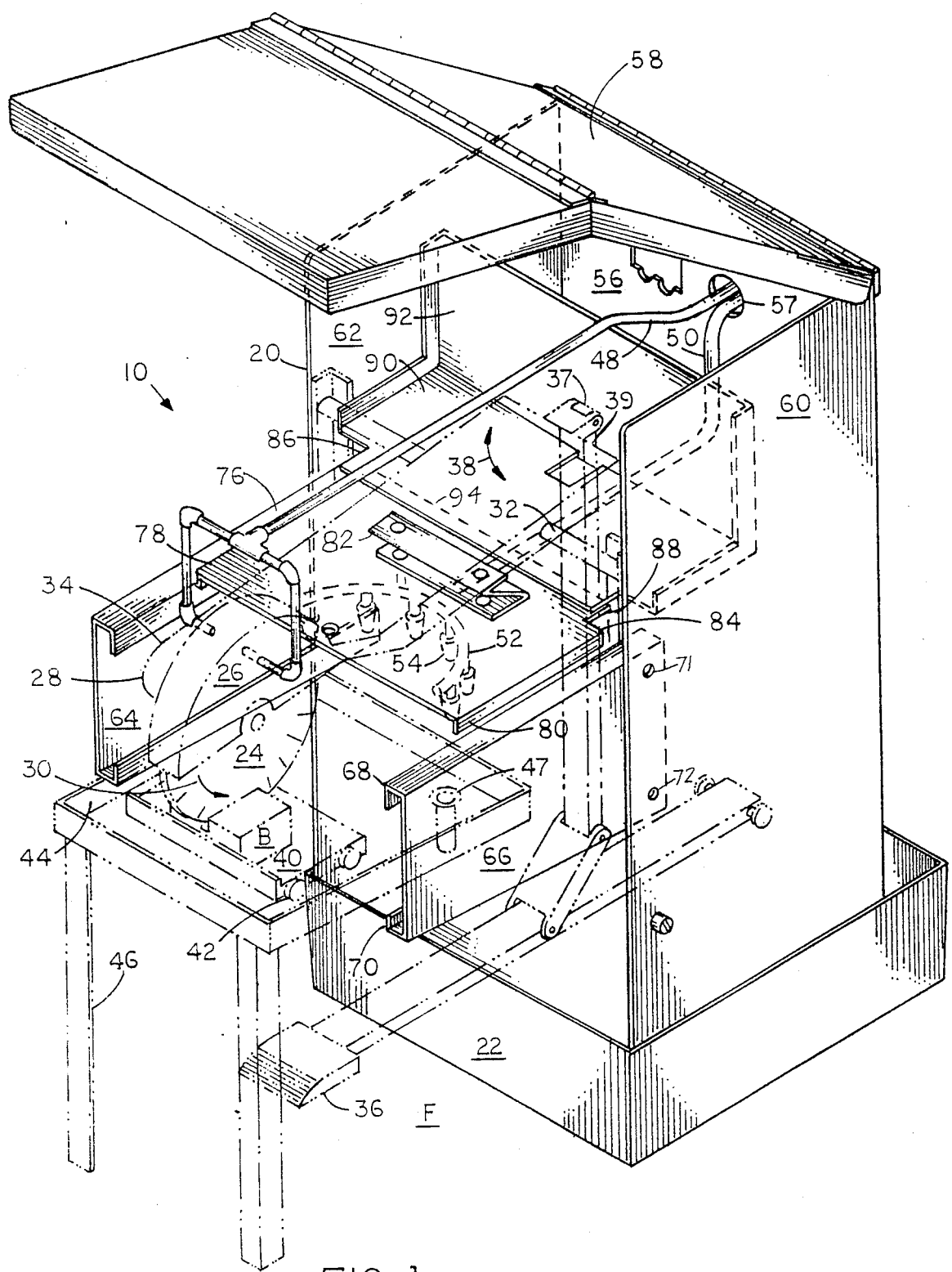
FIG. 1 is a front perspective view of the preferred embodiment, partly in phantom lines for exposition.

FIG. 1 shows the invention 10 as comprising certain shielding improvements for a representative or typical old art brick sawing system for safety and control of water and masonry particles.

KNOWN COMPONENTS

Known components in the system are typical of old saws such as the "Champion", and include a container 20 with a pan type base 22. The container houses a circular saw blade 24 with shroud 26 and with conventional motor means 28 for rotating the blade in the direction of the arrow 30. The saw can be raised and lowered about a pivot rod 32 on the saw-arm 34, tipped by conventional food pedal linkage 36, 37 and pull rod 39, as arrows 38 indicates. Any conventional linkage may be used. Work to be sawed is represented by a brick B carried on a saw table 40 that rolls parallel to the saw blade on wheels 42 guiding on a pan bottom subframe 44 fixed to the container and supported also by legs 46 that rest on the ground or a floor F. A drain 47 is provided in the pan bottom.

Water is provided when needed through a forked conduit 48 to the sides of the saw blade 24 for conventional wet-sawing and also through a conduit 50, or dry-cutting hose, to half-moon spray, a semi-circular or arc-shaped array 52 of spray nozzles 54 directed below the rotary saw clamped to the bottom of 76 shield for dry sawing. The back splash 56 has a hole 57 passing the conduits.

The back wall 56 or back splash of the container (as well as, to some extent, the top 58 or weather cover that rests on the saw arm when closed) and the side walls 60, 62, confine spray generated and projected to the rear by the saw blade 24, but in the old art, represented by the description to this point, are not generally effective. Even though the saw arm 34 is a relatively broad horizontal member for shielding, water and dust flung rearwardly in all directions by the saw blade tend to escape the housing and pollute the surroundings, in part because shielding of the old art cabinet does not overlap and move with the saw and saw arm in the manner of the present invention.

THE NEW COMPONENTS AND THE NEW OPERATION TO CONTROL SPLASHING AND DISPERSAL

To keep the area surrounding the brick saw clean and free of water, five new shielding elements are provided. One of these rises and falls and two of these are stationary part of the container or cabinet, and the rising and falling shield is in between the two stationary shields, but do not conflict with them.

To prevent sideways escape of water, or of dust of any type material being cut, or a combination of the two, the invention provides a fixed vertical shield 64 extending forward as far as the saw blade on the left of the saw blade 24 and a similar vertical shield 66 on the right, both extending from above the saw blade down to the saw table carriage 40 or below. Each of these shields 64 and 66 has a channel-shaped or returned flange 68, 70 along the top and bottom, to trap debris. Adjusted in tip at screws 72 and 71, the shields drain to the rear into the base pan 22.

The back splash 56 takes the greatest amount of water and particles flung by the saw blade 24. To prevent laterally upward escape of material by spattering, flinging, and blowing up or down, a broad shield 76 with side edges 78, 80 turned down in between shields 64, 66 is provided.

This broad shield 76 extends under saw arm 34 and slopes down to the rear. It moves up and down with the saw arm 34 to which it is attached by a flexible "Z"-shaped flange member 82, and has cut-outs 84, 86 at the sides for motion clearance at the rear corners, where it moves in-and-out relative to the housing because the back edge 88 is substantially lower than the front edge.

To prevent escape of water or other debris flung rearwardly past the back edge 88 or splashed forwardly toward it from the back splash, "L"-shaped shielding comprising joined panels 90 and 92 is provided. Panel 90 is horizontal and extends toward the front where the front edge 94 overlaps the rear edge 88 of the broad shield 76. This may be a rubbing contact or nearly so, for tightness, the "Z"-flange providing flexibility to accommodate the relative motion.

Panel 90 is supported by the housing sidewalls 60, 62 at the sides, and along the back joins panel 92 which is upwardly disposed at right angles to it. Panel 92 is parallel-spaced forwardly from the back splash 56 for good access and better anti-splash characteristics. Material collected drops into the base pan 22.

It will be seen that the mechanism associated with the saw is protected by the novel, economical and ruggedly simple shielding of this invention.

Figure 2:
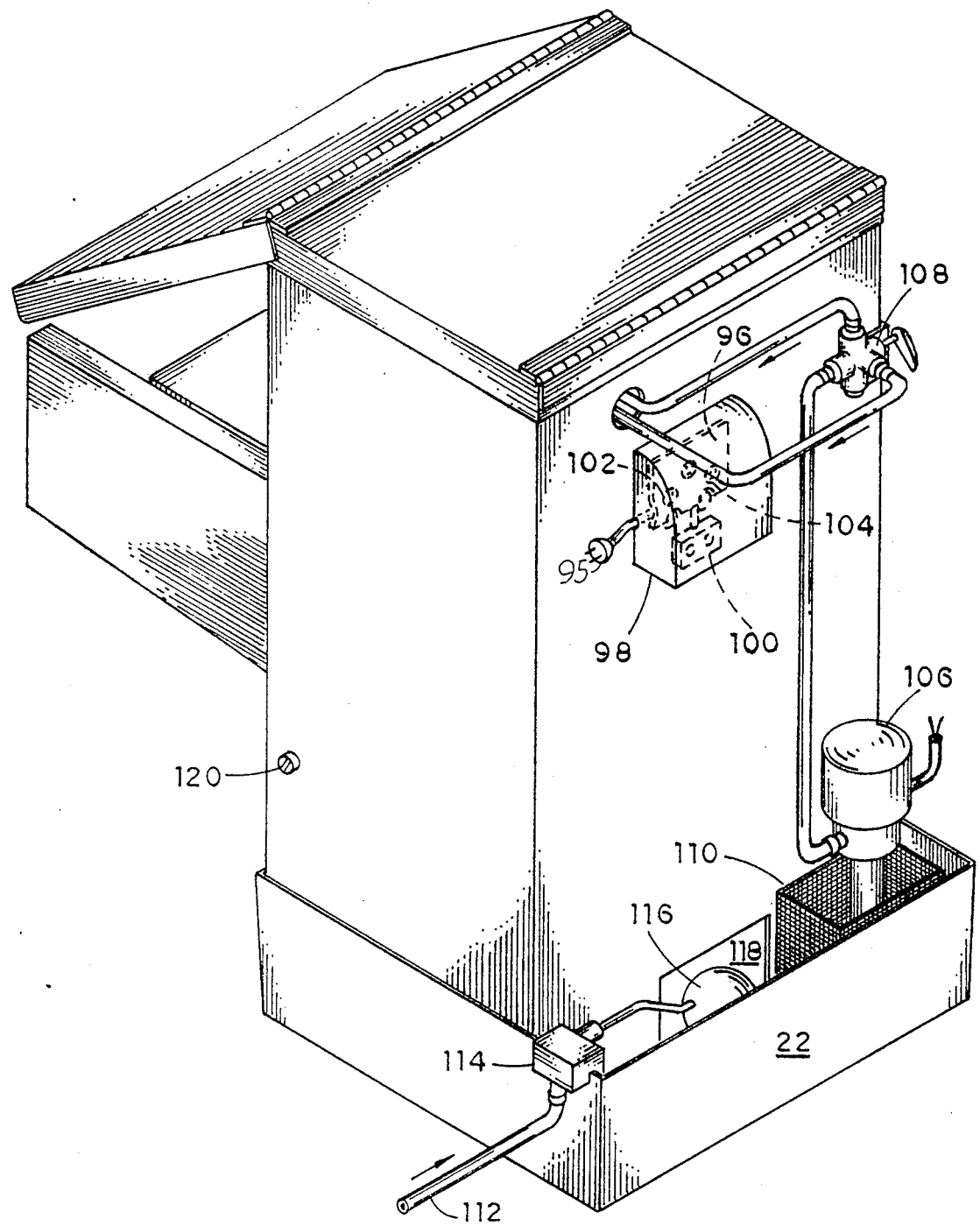
FIG. 2 is a rear perspective view thereof.

FIG. 2 shows that the liquid and electrical controls are of generally conventional nature, but especially easy to use, and protected against the weather. Electric power (220 or 110 VAC as needed) is supplied through a conventional connector 95 from an extension cord to gang receptacle box 96 with cover 98 and on-off switch 100 on the cabinet or housing; box 96 when a respective plug (not shown) is used, distributes power through socket 102 to the saw motor and through socket 104 to the water recycling pump 106.

Three-way valve 108 controls the water distribution from this pump and can be set at "off", or to supply water through the conduits to the saw shroud or to the dust damper array.

Water pump 106 has a fine-mesh screened intake 110 in the base 22 to separate sediment.

Feed water enters the base pan from tubing 112 through the feed water valve 114 and feed water level is conventionally regulated by the float 116. Opening 118 permits water and collected material to flow from one side of the base to the other, in and out of the housing, and the base has a conventional drain, not shown.

A container electrical-grounding connection for safety is shown at 120.

The shingled overlap of the saw shroud by the broad shield at the front of the broad shield, at the rear by the horizontal panel front edge, and the resilient support of the broad shield to the saw arm by the "Z"-shaped member are particularly pointed out.

It will be appreciated that safety, cleanliness, economy and high production are provided by the invention, in shielding all splashes from operation of the saw, top, bottom, back and sides, by means of shingled shields at the top and side shields and shield for the saw blade.

Exact dimensions are not critical, proportioning to shield a particular saw installation will be found convenient.

An example of a dimension would be a ten-inch (25 cm) spacing between upright panel 90 and the backsplash. Assembly may be by conventional means; bolts and sheet metal screws are preferred for ease or removal of the fasteners.

The added shields are simple in construction, being flat panels easily bent at right angles on a brake. Material may be mild carbon steel, stainless steel, or other suitable metal about $\frac{1}{8}$ inch (8 mm) thick.

It will be appreciated that "brick" includes similar types of materials to be sawed.

This invention is not to be construed as limited to the particular forms disclosed herein, since these are to be regarded as illustrative rather than restrictive. It is, thererfore, to be understood that the invention may be practiced within the scope of the claims otherwise than as specifically described.

What is claimed and desired to be protected by United States Letters Patent is:

1. A system for brick sawing, including a container, a rotary saw defining a cutting plane, a driving means for rotating the said rotary saw, a pivot arm pivotally attached to said container, said pivot arm mounting the said rotary saw in position for raising and lowering the said rotary saw relative to said brick to be sawn, a saw table for carrying said brick to be sawn and positioned under the said rotary saw for movement parallel to said cutting plane, a table guide means for guiding the said saw table along a track parallel to said cutting plane, a first nozzle means for spraying water onto the said rotary saw for wet cutting of said brick, a second nozzle means for spraying water below the said rotary saw for suppressing dust during dry cutting of said brick, a shielding means for shielding against dispersal of spray, water and dust, said shielding means including the said rotary saw having a shroud and said container having a base pan, sides, a back-splash and a cover, said shielding means further characterized by: first and second vertical shields removably fixed to the said container's sides on respective sides of the said rotary saw in position for containing lateral splashes, a broad shield having: an attachment for moving with the said pivot arm, a front edge underneath the said rotary saws shroud, a turned-down edge at each side adjacent a respective one of said first and second vertical shields and a rear edge; a fixed horizontal shield having a front edge, a rear edge and sides fixed to the said container's sides and said horizontal front shield overlapping with said broad shield's rear edge, an upright shield affixed along said horizontal shield rear edge in spaced relation with said conatiner's backsplash said attachment for moving with said pivot arm comprising a resilient member attaching to said broad shield to said pivot arm thereby providing a close but bind free shielding at said overlap between said broad shield rear edge and said fixed horizontal shield during said pivot arm movement, said second nozzle means attached to a bottom surface of said broad shield for movement therewith, said first nozzle means being positioned above said broad shield, a flow selecting means to provide for selecting between supplying water to said first or said second nozzle means, the brick saw system components coacting to provide directing of the flow of water and dust particles toward the backsplash along a path located beneath said broad shield and beneath said fixed horizontal shield with a minimum of splattering.

2. A system as recited in claim 1, further characterized by said resilient member being a "Z"-shaped spring.

3. A system as recited in claim 1, further characterized by said second nozzle means for spraying water below the said rotary saw being a half-moon shaped array of nozzles.

4. A system as recited in claim 3, further characterized by said flow selecting means for selecting flow of water spray comprising a three-way valve having respective connections for selectively supplying water onto the said rotary saw for wet cutting and below the said rotary saw for dry cutting.

* * * * *